United States Patent
Kesavan et al.

(10) Patent No.: US 9,165,196 B2
(45) Date of Patent: Oct. 20, 2015

(54) AUGMENTING ADAS FEATURES OF A VEHICLE WITH IMAGE PROCESSING SUPPORT IN ON-BOARD VEHICLE PLATFORM

(71) Applicant: Intel Corporation, Santa Clara, CA (US)

(72) Inventors: Vijay Sarathi Kesavan, Hillsboro, OR (US); Victor B. Lortz, Beaverton, OR (US); Anand P. Rangarajan, Hillsboro, OR (US); Somya Rathi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 406 days.

(21) Appl. No.: 13/679,280

(22) Filed: Nov. 16, 2012

(65) Prior Publication Data

US 2014/0139670 A1    May 22, 2014

(51) Int. Cl.
*G06K 9/00* (2006.01)
*B60W 50/00* (2006.01)

(52) U.S. Cl.
CPC ....... *G06K 9/00791* (2013.01); *B60W 50/0098* (2013.01); *B60W 2050/0083* (2013.01); *B60W 2050/0094* (2013.01); *B60W 2050/0095* (2013.01); *B60W 2420/42* (2013.01)

(58) Field of Classification Search
None
See application file for complete search history.

(56) References Cited

U.S. PATENT DOCUMENTS

| | | | | |
|---|---|---|---|---|
| 7,337,650 | B1 * | 3/2008 | Preston et al. | 73/1.38 |
| 2005/0155808 | A1 * | 7/2005 | Braeuchle et al. | 180/402 |
| 2005/0228588 | A1 * | 10/2005 | Braeuchle et al. | 701/301 |
| 2009/0292468 | A1 * | 11/2009 | Wu et al. | 701/301 |
| 2009/0315992 | A1 | 12/2009 | Haug | |
| 2010/0183192 | A1 * | 7/2010 | Fritsch et al. | |
| 2010/0305755 | A1 * | 12/2010 | Heracles | 700/253 |
| 2011/0007162 | A1 | 1/2011 | Haug | |
| 2012/0092187 | A1 | 4/2012 | Scholl et al. | |
| 2014/0133698 | A1 * | 5/2014 | Fernandez et al. | 382/103 |
| 2014/0244125 | A1 * | 8/2014 | Dorum et al. | 701/70 |

FOREIGN PATENT DOCUMENTS

| | | | |
|---|---|---|---|
| EP | 1918897 A2 | 5/2008 | |
| KR | 10-2012-0116204 A | 10/2012 | |

OTHER PUBLICATIONS

International Search Report and Written Opinion received for PCT Patent Application No. PCT/US2013/048223 mailed on Sep. 25, 2013, 10 pages.

* cited by examiner

*Primary Examiner* — Mussa A Shaawat
(74) *Attorney, Agent, or Firm* — Sutherland Asbill & Brennan LLP (57) ABSTRACT

Systems and methods directed to augmenting advanced driver assistance systems (ADAS) features of a vehicle with image processing support in on-board vehicle platform are described herein. Images may be received from one or more image sensors associated with an ADAS of a vehicle. The received images may be processed. An action is determined based upon, at least in part, the processed images. A message is transmitted to an ADAS controller responsive to the determination.

21 Claims, 4 Drawing Sheets

AUGMENTING ADAS FEATURES OF A VEHICLE WITH IMAGE PROCESSING SUPPORT IN ON-BOARD VEHICLE PLATFORM

TECHNICAL FIELD

Embodiments of this disclosure relate generally to information systems in vehicles, and more particularly, to augmenting advanced driver assistance systems features of a vehicle with image processing support in on-board vehicle platform.

BACKGROUND

Advanced driver assistance systems (ADAS) are systems intended to help the driver in the driving process, often aimed at increasing vehicle and road safety, as well as providing convenience. An example of an ADAS feature is lane departure warning. In certain conventional lane departure warning systems, one or more laser sensors, infrared sensors, or a combination thereof, can be implemented.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Embodiments of the disclosure are described more fully hereinafter with reference to the accompanying drawings in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Certain embodiments herein may be directed to augmenting ADAS features of a vehicle with image processing support in an on-board vehicle platform. A vehicle may include one or more processors, networking interfaces, and other computing devices that may enable it to capture image data, process the image data, and augment ADAS features of the vehicle with image processing support in an on-board vehicle platform. In some embodiments, images from the ADAS cameras may be transferred at a low frequency to an on-board vehicle platform, such as an in-vehicle infotainment (IVI) system. The on-board vehicle platform may process the images to offer additional ADAS features. The ADAS features implemented in the IVI system are typically not mission-critical safety features and thus would likely not need strict real-time performance. The IVI system may not be a replacement to the dedicated ADAS processor but rather may function as a complimentary augmentation of the ADAS subsystem. Example embodiments of the disclosure will now be described with reference to the accompanying figures.

Figure 1:
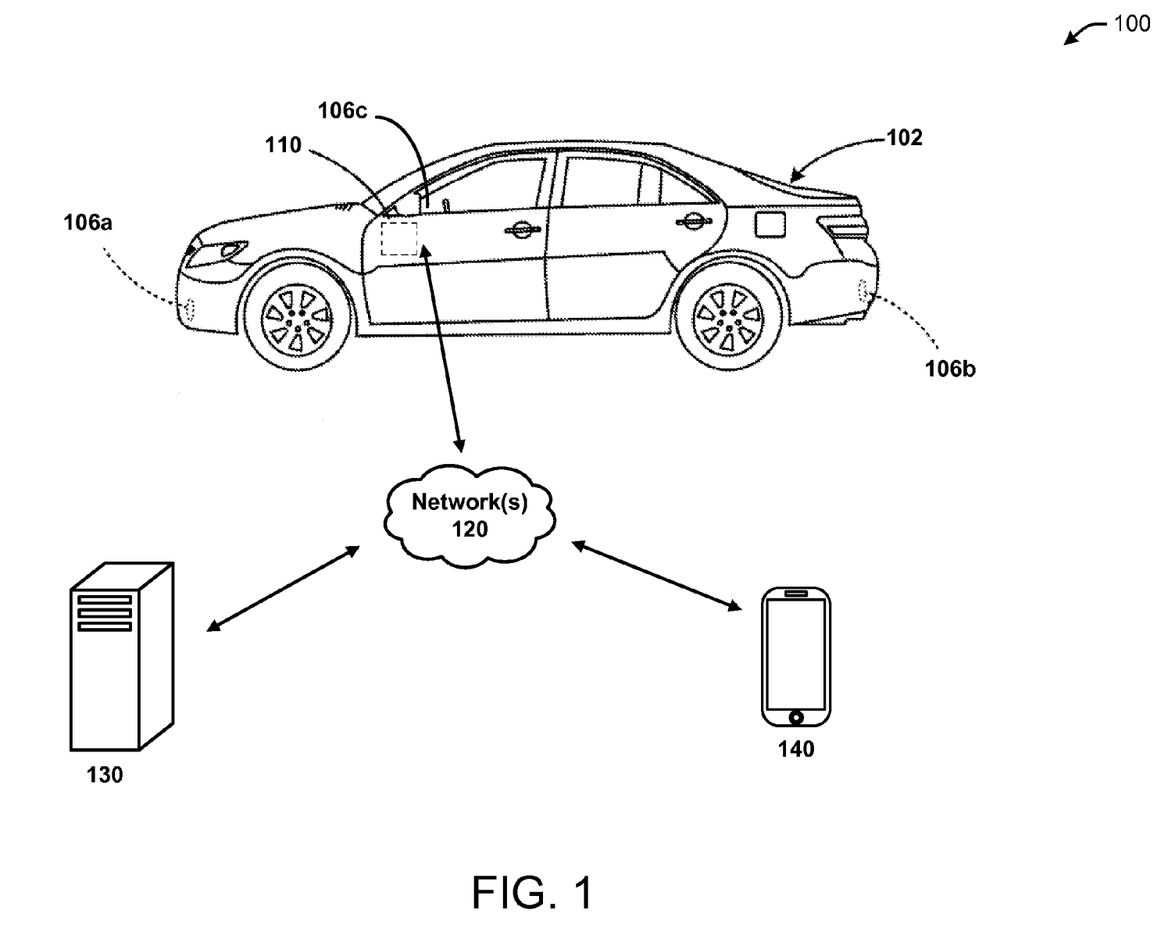
FIG. 1 is a block diagram of a configuration for augmenting ADAS features of a vehicle, in accordance with an embodiment of the disclosure.

Referring now to FIG. 1, illustrates an example system configuration 100, in accordance with an embodiment of the disclosure, for augmenting ADAS features of a vehicle with image processing support in on-board vehicle platform. The configuration may include, but is not limited to one or more vehicles 102. The vehicle 102 may include one or more systems that include one or more processing devices for implementing functions and features associated with the vehicle 102, as will be discussed in greater detail below. The vehicle 102 may include one or more image sensors 106a-106b (collectively referred to as 106) capable of capturing data associated with the vehicle 102. For example, an image sensor 106 may be an external video camera 106a, 106b that may capture data, such as video, regarding road conditions as the vehicle 102 progresses in its trip.

The vehicle 102 may include a vehicle on-board platform, such as an in-vehicle infotainment (IVI) system 110. As used herein, an IVI system 110 may refer to a system in a vehicle 102 that provides entertainment and informational features for the vehicle 102. The IVI system 110 may be part of the vehicle's main computer or a stand-alone system. The IVI system 110 may communicate with a system for augmenting ADAS features of a vehicle 102, as described herein. The IVI system 110 may further include one or more processors communicatively coupled to an electronic memory, described in greater detail below.

The vehicle 102 may establish a connection with a remote server 130 over multiple types of networks 120, such as a wireless fidelity (Wi-Fi) network, a Wi-Fi Direct network, Bluetooth®, a radio network, a cellular network (e.g., third generation or fourth generation), a satellite network, a cable network, a landline-based network, the Internet, intranets, a telephone network, a television network, data networks, or other communication mediums connecting multiple computing devices to one another, as non-limiting examples. According to certain embodiments herein, multiple networks may be leveraged by the vehicle 102 to enable communication with the remote server 130.

In some embodiments, the vehicle 102 may be configured to be coupled to an electronic device 140. The electronic device 140 may include one or more electronic device processors communicatively coupled to an electronic device memory, as well as user interface and an output element, such as a speaker of the vehicle 102. The electronic device 140 may communicate with the vehicle 102 via a communicative link. In certain embodiments herein, devices related to the implementation of augmenting ADAS features of a vehicle 102 may exist onboard an IV system 110 such that the functionality described herein may be associated with the IVI system 110. In other embodiments, the functionality described herein may reside independently of other systems or may be associated with various other systems.

The IVI system 110 may be in communication with one or more electronic devices 140. In one aspect, an electronic device 140 may serve as an extension of the IVI system 110. For example, if the IVI system 110 does not have Internet capabilities, the IVI system 110 may communicate with an electronic device 140 associated with the vehicle 102 to utilize the communication capabilities of the electronic device 140.

The communicative link may be any suitable electronic communication link including, but not limited to, a hardwired connection, a serial link, a parallel link, a wireless link, a Bluetooth® channel, a ZigBee® connection, a wireless fidelity (Wi-Fi) connection, a Near Field Communication (NFC) protocol, a proprietary protocol connection, or combinations thereof. In one aspect, the communicative link may be secure such that it is relatively difficult to intercept and decipher communications between the electronic device 140 and the IVI system 110. In certain embodiments, the communicative link may be encrypted. Further, in certain embodiments, the communications may be encrypted at more than one open systems interconnections (OSI) model layer. For example, the communications between the electronic device 140 and the vehicle 102 may be encrypted at both the application layer and the transport or link layer. In some embodiments, the communicative link may be through the communication capabilities of an electronic device 140 associated with the vehicle 102. For example, if the vehicle 102 does not have Internet capabilities, the IVI system 110 may be able to access data through its association with, for example, a smartphone with cellular communication capabilities.

For the purposes of this discussion, the vehicle 102 may include, but is not limited to, a car, a truck, a light-duty truck, a heavy-duty truck, a pickup truck, a minivan, a crossover vehicle, a van, a commercial vehicle, a private vehicle, a sports utility vehicle, a tractor-trailer, an aircraft, an airplane, a jet, a helicopter, a space vehicle, a watercraft, a motorcycle, or any other suitable vehicle with information and media capability. However, it will be appreciated that embodiments of the disclosure may also be utilized in other transportation or non-transportation related application where augmenting ADAS features may be implemented.

Vehicle sensors may be any suitable data-gathering element associated with the vehicle 102. As a result, vehicle sensors may gather audio, visual, tactile, or environmental information within or associated with the vehicle 102. For example, the vehicle sensors may include one or more cameras 106c in the cabin of the vehicle 102 that may capture images of occupants as well as scene information, such as lighting conditions within the vehicle 102 or weather outside of the vehicle 102. Vehicle sensors may also be GPS devices, a microphone, seat weight sensors, or other type of data-gathering element associate with the vehicle 102.

Furthermore, a suitable electronic device can include, but are not limited to, smartphones, tablets, laptop computers, electronic book reading devices, processor-based devices, etc.

Figure 2:
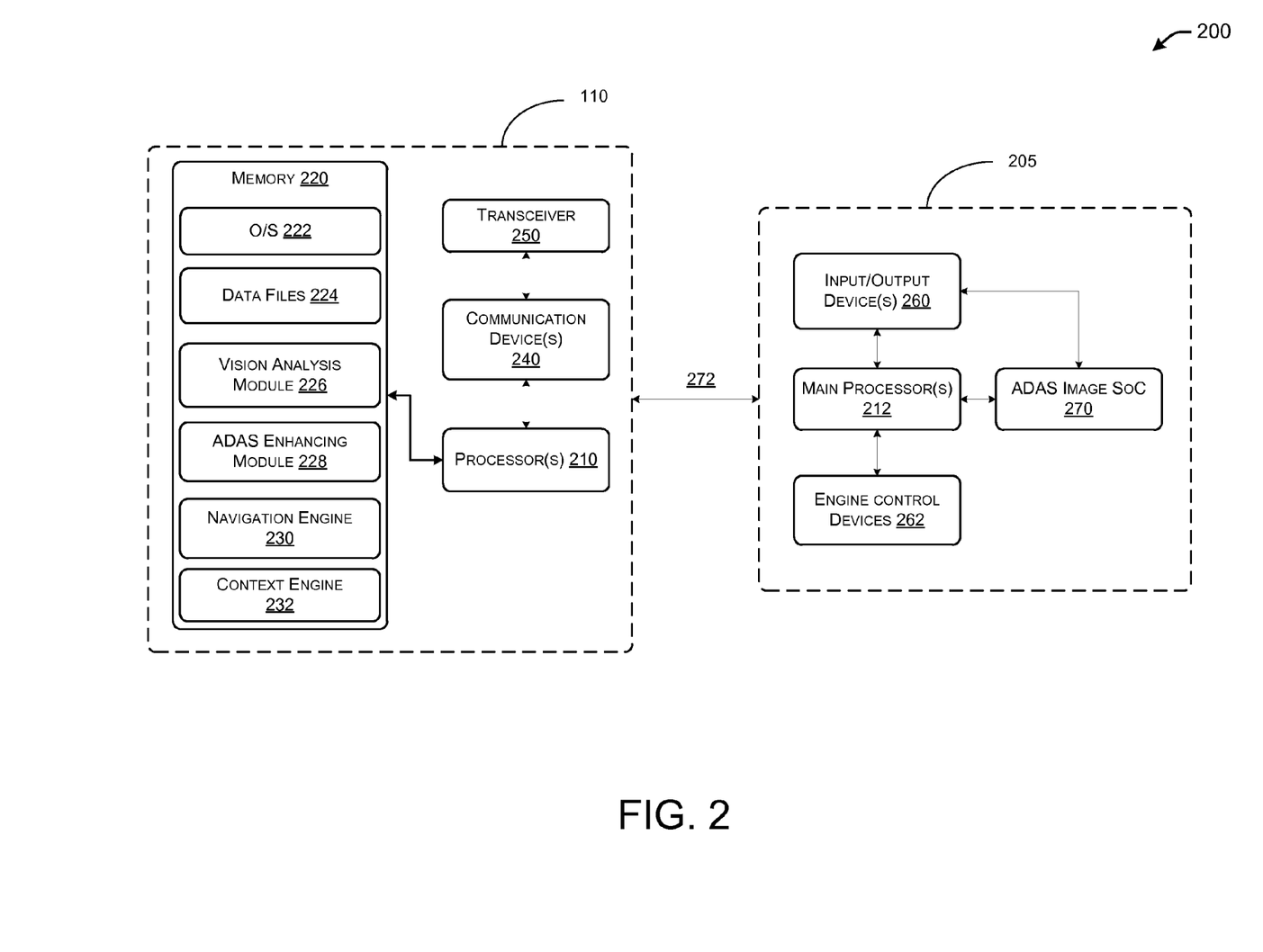
FIG. 2 is a diagram of a system for augmenting ADAS features of a vehicle, in accordance with an embodiment of the disclosure.

FIG. 2 depicts a block diagram of an example vehicle computing system 200 in a vehicle, e.g., vehicle 102 in FIG. 1, for augmenting ADAS features of a vehicle 102 with image processing support in an IVI system 110, among other things. As shown in FIG. 2, multiple vehicle systems may interact to facilitate providing augmented ADAS features. For example, a computing system 205 may exist for controlling a vehicle's standard devices or components, which may include engine devices, braking devices, power steering devices, door control devices, window control devices, etc., in one embodiment. The computing system 205 may also include various input/output ("I/O") devices 260 that may exist in a vehicle 102, such as collection devices, such as vehicle sensors (e.g., a microphone, a seat weight sensors, cameras, both interior-facing cameras 106c for capturing images within a vehicle 102 and exterior-facing cameras 106a, 106b for capturing images from a vehicle's surroundings) and display devices, such as light-emitting diode ("LED") displays and organic light-emitting diode ("OLED") displays, as non-limiting examples. A main processor 212 may communicate with the standard engine control devices 262 and I/O devices 260 to activate the devices, send information to these devices, or collect information from these devices, as non-limiting examples.

The computing system 205 may include single-feature fixed-function devices, such as an ADAS image System on Chip (SoC) 270. An SoC may be an integrated circuit that integrates all components of a computing system into a single chip. The SoC may contain digital, analog, mixed-signal, and/or radio-frequency functions that may all be on a single chip substrate. The SoC may include a microcontroller, microprocessor, or digital signal processor core(s). In some embodiments, SoCs may include more than one processor core. SoCs may further include blocks, which may include a ROM, RAM, Electrically Erasable Programmable Read-Only Memory (EEPROM), flash memory, and/or any other type of non-volatile memory. SoCs may include one or more timing sources, such as oscillators and/or phase-locked loops. SoCs may include interfaces, such as USB, FireWire, Ethernet, Universal Asynchronous Receiver/Transmitter (USART), Serial Peripheral Interface (SPI) bus, and/or Media Oriented Systems Transport (MOST) bus. In some embodiments, the ADAS image SoC 270 may communicate with one or more I/O devices 260 of the computing system 205.

The computing system 205 may be in communication with the IVI system 110. As used herein, an IVI system may refer to a system in a vehicle that provides entertainment and informational features for the vehicle.

The IVI system 110 may include, but is not limited to, a processor 210, a memory 220, one or more communication devices 240, and a transceiver 250. The processor 210 may communicate with the communication devices 240 in the IVI system 110. For example, the processor 210 may communicate with the memory 220 to execute certain computer-executable instructions or modules, such as 226, 228, 230, 232, stored in the memory 220 to facilitate augmenting ADAS features of the vehicle 102 as described herein. In one embodiment, the processor 210 may also communicate with the one or more communication devices 240 to send and receive messages from various types of networks, such as those listed above. A transceiver 250 may facilitate the sending and receipt of such messages. In some embodiments, a transmitter and a separate receiver may be utilized to send and receive messages, respectively.

According to certain embodiments herein, the processor 210, the memory 220, the communication devices 240, and the transceiver 250 may be onboard a system board (hereinafter "onboard") in the IVI system 110. In this way, these devices may operate out of band, or with access to only minimal power, such as in association with a vehicle shutdown, hibernation, or standby, as non-limiting examples. In one example, a backup battery may be used to provide sufficient power to enable the devices in the IVI system 110 to operate out of band. Thus, the devices in the IVI system 110 may remain awake (e.g., after a vehicle 102 has been shutdown) and may provide certain functionality, such as communicating with a user device, e.g., electronic device, to send and receive messages in association with augmenting ADAS features of the vehicle 102. Such functionality may be referred to herein as out of band or operating out of band. The devices in the IVI system 110 may also communicate with one another while operating out of band. For example, the processor 210 may communicate with the memory 220 to execute computer-executable instructions or modules therein while operating out of band.

The devices and/or program modules in the computing system 205 may shut down when a vehicle 102 is powered down, for example, and therefore may not operate out of band. For example, a main operating system (not shown) that may control standard components in a vehicle 102, such as an engine, brakes, doors, windows, hard disks, or other devices in communication with the main operating system or one of its program modules, may not be operational when the vehicle 102 is shut down. The O/S 222 in the memory 220, however, may be operational when the vehicle 102 is shut down, or otherwise in a low power state such as hibernation or standby, because it may be located onboard or at the board level in firmware, according to certain embodiments herein. Such a configuration may enable devices in the IVI system 110 to send messages, receive messages, and cause the performance of augmenting ADAS features of the vehicle 102. As an example, according to certain embodiments, the processor 210 of the IVI system 110 may communicate with the main processor 212 (and/or other devices) of the computing system 205 to wake the main processor 212 so that it may cause performance of the functions requested by a user via one or more action codes. In one embodiment, such communication may occur via the CAN BUS protocol, as will be described in greater detail below.

In certain embodiments, the processor 210 of the IVI system 110 may also communicate with the main processor 212 and/or other devices of the computing system 205 in response to executing computer-executable instructions in a context engine, such as 232, to generate or process context information.

The processors 210 and 212 may include any number of suitable processing devices, such as a central processing unit ("CPU"), a digital signal processor ("DSP"), a reduced instruction set computer ("RISC"), a complex instruction set computer ("CISC"), a microprocessor, a microcontroller, a field programmable gate array ("FPGA"), or any combination thereof. In one embodiment, the system 200 may be based on an Intel® Architecture system, and the processors 210 and chipset may be from a family of Intel® processors and chipsets, such as the Intel® Atom® processor family. The processor 210 may also include one or more processors as part of one or more application-specific integrated circuits ("ASICs") or application-specific standard products ("AS-SPs") for handling specific data processing functions or tasks. Additionally, any number of suitable I/O interfaces and/or communications interfaces (e.g., network interfaces, data bus interfaces, etc.) may facilitate communication between the processors 210 and other components of the system 200.

The one or more communication devices 240 may facilitate communications between the system 200 and other devices that may be external to a vehicle 102 containing the system 200. For example, the one or more communications devices 240 may enable the system 200 to receive messages from an electronic device 140 and/or send messages to an electronic device 140 as illustrated in FIG. 1. The communication devices 240 may enable various types of communications over different networks, such as wireless networks including, but not limited to, a wireless fidelity (Wi-Fi) network, a Wi-Fi Direct network, a radio network, a cellular network, a GPS network, a ZigBee® connection, a Bluetooth® channel, proprietary protocol connections, and other wireless links, as well as hardwired connections, serial link connections, parallel link connections or combinations thereof.

According to various configurations, one or multiple interface cards or circuits may support the multiple networks named above. In one embodiment, such one or more interface cards or circuits may be onboard such that firmware in the memory 220 may access and control communications associated with the IVI system 110.

Turning now to the contents of the memory 220, the memory 220 may include any number of suitable memory devices, such as caches, read-only memory devices, random access memory ("RAM"), dynamic RAM ("DRAM"), static RAM ("SRAM"), synchronous dynamic RAM ("SDRAM"), double data rate ("DDR") SDRAM ("DDR-SDRAM"), RAM-BUS DRAM ("RDRAM"), flash memory devices, electrically erasable programmable read only memory ("EE-PROM"), non-volatile RAM ("NVRAM"), universal serial bus ("USB") removable memory, magnetic storage devices, removable storage devices (e.g., memory cards, etc.), and/or non-removable storage devices. As desired, the memory 220 may include internal memory devices and/or external memory devices in communication with the system 200.

The memory 220 may store data, executable instructions, and/or various program modules utilized by the processor 210. Examples of data that may be stored by the memory 220 include data files 224 and any number of suitable program modules and/or applications that may be executed by the processor 210, such as, but not limited to, an operating system ("OS") 222, an vision analysis module 226, an ADAS enhancing module 228, a navigation engine 230, and a context engine 232. Each of these modules may be implemented as individual modules or, alternatively, one or more of the modules may perform all or at least some of the functionality associated with the other modules. In certain embodiments, these modules may be stored as firmware in a read-only memory 220, thereby making it more difficult for the functions described herein to be tampered with or disabled.

The data files 224 may include any suitable information that may facilitate augmenting ADAS features of a vehicle 102. Example information may include, but is not limited to, information that may be used to authenticate an electronic device 140, capture data through one or more image sensors 106, process images, and obtain information from a central server 130, as well as other information that may facilitate the processes described herein.

The operating system 222 may include a suitable module or application that facilitates general operation of the system 200, as well as the execution of other program modules illustrated in the memory 220 in FIG. 2.

The vision analysis module 226 may perform a number of functions to facilitate processing of images received from the ADAS image SoC 270. The vision analysis module 270 may be in communication with the ADAS enhancing module 228 to determine or identify types of processing to be applied to the received images.

The ADAS enhancing module 228 may perform a number of functions to facilitate augmenting ADAS features of the vehicle. For instance, the ADAS enhancing module 228 may receive or otherwise obtain information from one or more sources (e.g., navigation engine 230, context engine 232, remote server 130, electronic device 140, etc.). Further, ADAS enhancing module 228 may communicate with vision analysis module 226 to process image using one or more applicable techniques or algorithms. ADAS enhancing module 228 may then analyze data generated during the processing of images and may determine or identify an action. For example, the action may be to dim the headlights, change the speed of the windshield wipers, or generate a warning to the driver of the vehicle to notify the driver of a lane departure by the vehicle 102.

The navigation engine 230 may perform a number of functions to provide an electronic map combined with route instructions, usually displayed on a dashboard video screen. For example, navigation engine 230 may receive continuous information from one or more GPS devices of the vehicle and may update the location of the vehicle 102 on a map displayed to the driver. The navigation engine 230 may obtain information regarding retail businesses, restaurants, traffic conditions, and other points of interest based upon, at least in part, the data received from the one or more GPS devices of the vehicle 102. The navigation engine 230 may communicate with the ADAS enhancing module 228 and transmit data to facilitate augmenting ADAS features of the vehicle 102.

The context engine 232 may perform a number of functions to facilitate formation and processing of context information. For example, context engine 232 may identify existing context information based upon received data, generate context information based upon received data, or process (e.g., augment or update) context information based upon received data. The context engine 232 may obtain related information using the context information, such as recommendations or other information that may be used to assist the driver or occupant of the vehicle 102. Context engine 232 may transmit the related information and/or the context information to the ADAS enhancing module 228 to facilitate augmenting ADAS features of the vehicle 102.

One or more bus communication modules (not shown) may include various protocols that may be used by devices in the system 200 to communicate with one another. An example protocol may be the CAN (controller area network) BUS protocol, in which communication occurs between devices over a controller area network without a host computer device. For example, the processor 210 may use the CAN BUS protocol to communicate with a main processor 212 to wake the main processor 212 and instruct it to activate an I/O device 260, in one example. Protocols in addition to the CAN BUS protocol, such as other message-based protocols, may be used in other embodiments. In other examples, a chipset (not shown) may be provided to control communications between the devices in the vehicle computing system 200.

In addition to or alternative to the memory 220, other embodiments may include one or more suitable computer-readable media that may be provided for storing computer-executable instructions such as those stored in the memory 220. One or more processing devices, such as the processor 210, may execute such computer-executable instructions to facilitate the remote management of a vehicle, as described above in association with the modules 226, 228, 230, 232 in the memory 220. As used herein, the term "computer-readable medium" may describe any form of suitable memory or memory device for retaining information in any form, including various kinds of storage devices (e.g., magnetic, optical, static, etc.). Indeed, various embodiments of the disclosure may be implemented in a wide variety of suitable forms.

Figure 3:
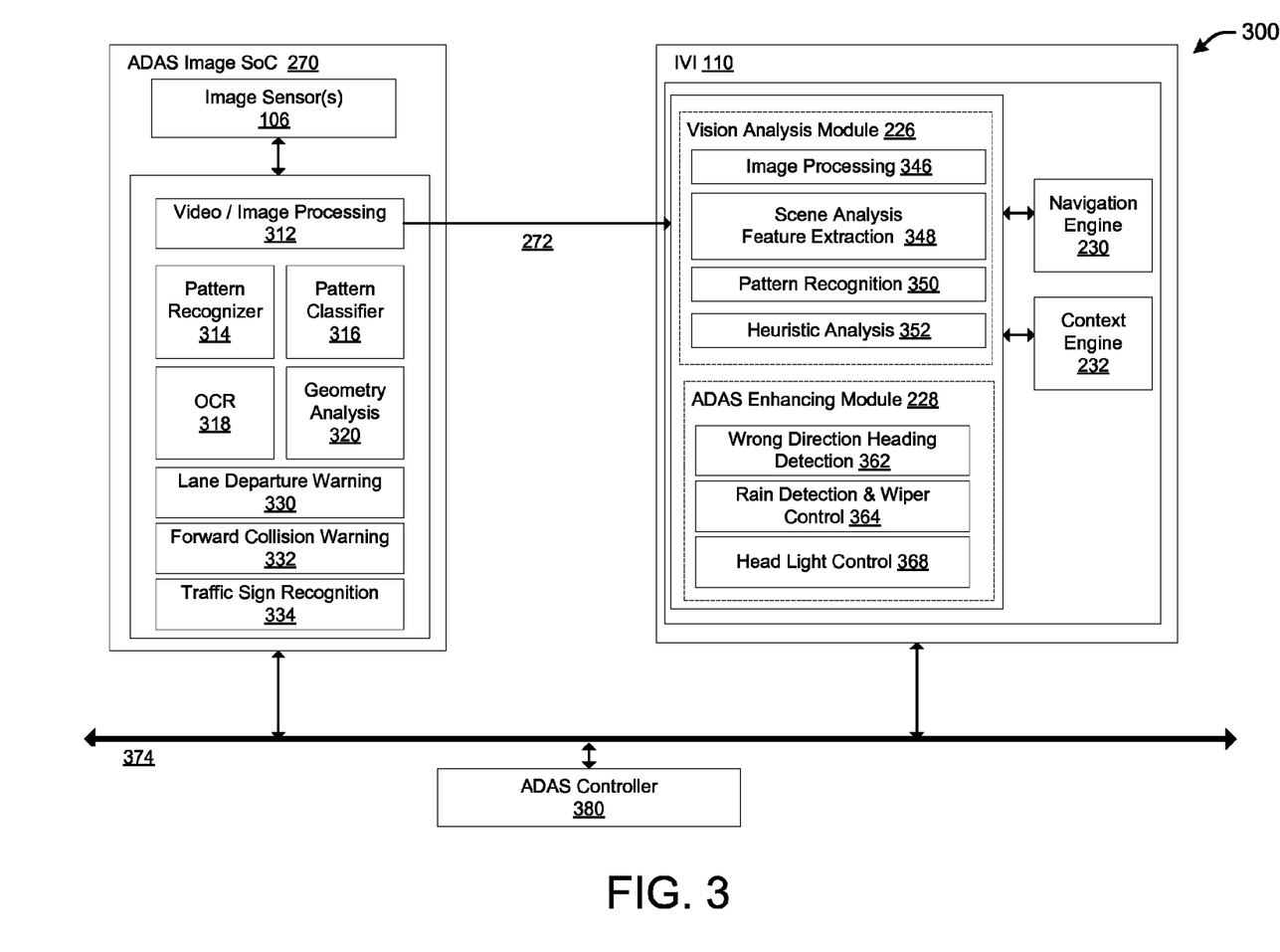
FIG. 3 is a diagram of a system for augmenting ADAS features of a vehicle, in accordance with an embodiment of the disclosure.

FIG. 3 depicts a diagram of a system for augmenting ADAS features of a vehicle, in accordance with one embodiment of the disclosure. In brief overview, system 300 may include an ADAS image SoC 270. The ADAS image SoC 270 may be associated with one or more image sensors 106. The image sensors 106 may capture images in and/or around the vehicle 102 and transmit the images to video/image processing module 312 of the ADAS image SoC 270. The ADAS image SoC may also include a pattern recognizer 314, pattern classifier 316, an optical character recognition (OCR) module 318, and/or a geometry analysis module 320. Further, ADAS image SoC 270 may include a lane departure warning module 330, a forward collision warning module 332, and/or a traffic sign recognition module 334. The ADAS image SoC 270 may be in communication with an IVI system 110 of the vehicle 102. The ADAS image SoC 270 may communicate with the IVI system 110 over a connection 272, which may be a wired or wireless channel or mode. In some embodiments, connection 272 may be one of any wired connection as described herein. In some embodiments, connection 272 may be one of any wireless connection as described herein. Connection 272 may be a wireless connection. For example, connection 272 may be a radio link or an optical link. A radio link may include a Bluetooth connection, a Near Field Communication connection, a cellular data connection, a point-to-point connection, or a Wi-Fi connection. An optical link may include a fiber optic connection or an infrared data connection. The IVI system 110 may include a vision analysis module 226 and an ADAS enhancing module 228. Further, the IVI system 110 may include a navigation engine 230 and/or a context engine 232. The ADAS image SoC 270, IVI system 110, and ADAS controller 380 may communicate with each other via a bus, such as 374, using at least one communication protocol, such as CAN BUS protocol.

Still referring to FIG. 3, in greater detail, one or more image sensors 106, such as cameras may capture video in and/or around the vehicle 102. In some embodiments, the image sensors 106 can capture continuous video. The video/image processing module 312 may receive the images from the image sensors 106 and process single frames or a sample of frames. The video/image processing module 312 may communicate with one or more of a pattern recognizer 314, a pattern classifier 316, OCR module 318, and a geometry analysis module 320.

The pattern recognizer 314 may perform a number of functions to process received images and identify patterns in an image or a series of images. A pattern classifier 316 may perform a number of functions to determine a kind of pattern recognized by the pattern recognizer 314. An OCR module 318 may perform functions to convert an image to identify text. A geometry analysis module 320 may perform functions to process images using geometric algorithms and techniques. The modules may be in communication with the video/image processing module 312 and/or the various ADAS feature modules 330, 332, 334 of the ADAS image SoC 270.

The ADAS image SoC 270 may include a lane departure warning (LDW) module 330. The LDW module 330 may instruct the video/image processing module 312 to determine a distance of the wheel from the lane. This may be done by the video/image processing module 312 communicating with the pattern recognizer 314 and pattern classifier 316 to identify and determine lane markers in an image. The video/image processing module 312 may further communicate with the geometry analysis module 320 to process image geometry and vehicle geometry using information that may be embedded or otherwise associated with an image, such as camera optic information. The LDW module 330 may further receive information from the computing system 205 indicating the use of blinkers of the vehicle 102. Based upon the processed image data and data received from computing system 205, LDW module 330 may determine to generate a warning alarm to alert the driver that the vehicle is close to the edge of a lane.

The ADAS image SoC 270 may include a forward collision warning (FCW) module 332. The FCW module 332 may instruct the video/image processing module 312 to detect objects near a vehicle 102. For example, FCW module 332 may instruct the video/image process module 312 to detect objects in successive image samples. If there is a change in size of the identified objects relative to the speed of the vehicle, FCW module 332 may determine a probability of collision with the object. The speed of the vehicle 102 may be received from the computing system 205 of the vehicle 102. The video/image processing module 312 may detect an object and track the relative size of the object using the geometry analysis module 320. The FCW module 332 may determine to generate a warning alarm to alert the driver if the probability of collision with the identified object exceeds a predetermined threshold.

The ADAS image SoC 270 may include a traffic sign recognition (TSR) module 334. The TSR module 334 may instruct the video/image processing module 312 to detect images. The video/image processing module 312 may process images received from the image sensors 106 using the OCR 318 module to identify text in the image and the pattern classifier 316 to identify a type of sign based upon the shape of the object. In some embodiments, the TSR module 334 may determine to alert the driver of the traffic sign.

In some embodiments, ADAS features may reside in the IVI system 110. For example, ADAS features may reside on the ADAS enhancing module 228 of the IVI system 110. ADAS features residing in or associated with the IVI system 110 may be non-critical safety features that would not require strict real-time performance. By leveraging the IVI system 110 for ADAS features of a vehicle 102, the ADAS features residing in the computing system 205 of the vehicle 102 may increase the capability of the computing system 205 for critical safety features, such as lane departures or forward collision detection.

The vision analysis module 226 may include an image processing module 346, a scene analysis feature extraction module 348, a pattern recognition module 350, and/or a heuristic analysis module 352. The vision analysis module 226 may include other modules, which may not be shown, to facilitate image processing.

The image processing module 346 may perform image processing functionality, such as zooming, cropping, projection of images, and/or complex signal processing algorithms (e.g., linear filtering, pixelation, hidden Markov modeling). The scene analysis feature extraction module 348 may process received images to identify one or more objects in the image. A pattern recognition module 350 may perform image process images to identify patterns in the image or patterns in a series of images.

The heuristic analysis module 352 may perform a number of functions to facilitate heuristic analysis of received images. Heuristic analysis may be a prior knowledge based analysis that determines or identifies risks based upon various decision rules or weighing methods. In some embodiments, the heuristic analysis module 352 may use machine-learning techniques. For example, thousands of previously classified test images may be processed in order to build a database of images to allow efficient analysis and categorization of individual items for future use.

Vision analysis module 226 may receive instructions from an ADAS enhancing module 228 regarding the processing of received images. The ADAS enhancing module 228 may include one or more of the following modules: wrong direction heading detection module 362, rain detection and wiper control module 364, and headlight control module 368.

The vision analysis module 226 and/or ADAS enhancing module 228 may receive information from another source, such as a navigation engine 230, a context engine 232, a remote server 130, an electronic device 140, a cloud service, and/or any other type of data repository. The vision analysis module 226 may process received images based upon, at least in part, information received from one or more sources. The ADAS enhancing module 228 may determine an action based upon, at least in part, data received from the one or more sources, such as the navigation engine 230, and the processed images received from the vision analysis module 226.

ADAS enhancing module 228, may include ADAS feature modules such as wrong direction heading detection (WDHD) module 362, rain detection and wiper control (RDWC) module 364, and/or headlight control (HL-C) module 368.

A WDHD module 362 may perform a number of functions to detect if the vehicle 102 is on the incorrect side of the road. For example, WDHD module 362 may receive or obtain information from a GPS device to determine the current driving direction in the current location of the vehicle 102. WDHD module 362 may instruct vision analysis module 226 to determine whether the vehicle 102 is on the correct side of the road. Vision analysis module 226 may process received images based upon, at least in part, a pattern recognition module 350, heuristic analysis module 352, scene analysis feature extraction module 348, and an OCR module (not shown) of the vision analysis module 226 to identify road signs, identify placement of road signs, detect lane markings, detect road dividers, among other factors. The WDHD module 362 may receive the processed images and related information as well as information from other sources, such as the GPS device and navigation engine 230, to determine if the vehicle 102 is on the wrong side of the road. The WDHD module 362 may determine that the vehicle is on the incorrect side of the road and may determine an action based upon the determination. For example, the WDHD module 362 may determine the action to be generating an audible warning to the driver of the vehicle 102. WDHD module 362 may then generate a message including the action and transmit the message to the ADAS controller 380 over the CAN bus 374. The ADAS controller 380 may then communicate with the computing system 205 of the vehicle 102 and the computing system 205 may identify the appropriate component to enact the action identified by the WDHD module 362.

Similarly, a RDWC module 364 may perform a number of functions to detect precipitation and responsive to identifying precipitation, may generate a message to transmit to the ADAS controller 380 to adjust the speed of the windshield wipers of the vehicle 102. RDWC module 364 may receive images processed by one or more components of the vision analysis module 226 as well as information from other sources, such as a central server 130, to determine an action.

As another example, HLC module 368 may perform a number of functions to control headlights in different environments and conditions. For example, HLC module 368 may direct the vehicle 102 to turn on/off headlights, brighten/dim headlights responsive to information received from a source, such as a navigation engine 230 and processed images received from the vision analysis module 226. For example, images may be processed and HLC module 368 may use the processed images and information received for other sources, such as the navigation engine 230, to distinguish between 2-lane roads and multi-lane roads, presence of a road divider, identify approaching vehicles, determine presence of a tunnel. HLC module 368 may generate a message, including an action, to the ADAS controller 380 to control the function of the headlights responsive to the determination.

Further, the ADAS image SoC 270, IVI system 110, and ADAS controller 380 may communicate with each other via a communication protocol, such as a CAN bus 374. For example, for safety-critical ADAS features, such as lane departure warnings, LDW module 330 may determine or identify an action based upon images processed by the video/image processing module 312. The message, which may include the determined action, may be transmitted to the ADAS controller 380 via the bus 374. The ADAS controller 380 may then communicate with the computing system 205 of the vehicle to enact the action identified by the LDW module 330, such as emitting a warning signal and verbal message to the driver of the vehicle through a speaker of the vehicle 102.

Similarly, for non-critical ADAS features, such as rain detection, RDWC module 364 may determine an action based upon images processed by the vision analysis module 226. For example, the pattern recognition module 350 and scene analysis extraction module 348, may process images received from the ADAS image SoC 270 to identify precipitation and its impact in visibility. The RDWC module 364 may determine an action based upon the processed images and information that may have been received from other sources, such as the navigation engine 230. For example, the RDWC module 364 may determine that the windshield wipers should be turned on and the appropriate wiper speed. The message may then be transmitted by the ADAS enhancing module 228 to the ADAS controller 380 over the bus 374. The ADAS controller 380 may then communicate with the computing system 205 of the vehicle to enact the action identified by the RDWC module 364.

Figure 4:
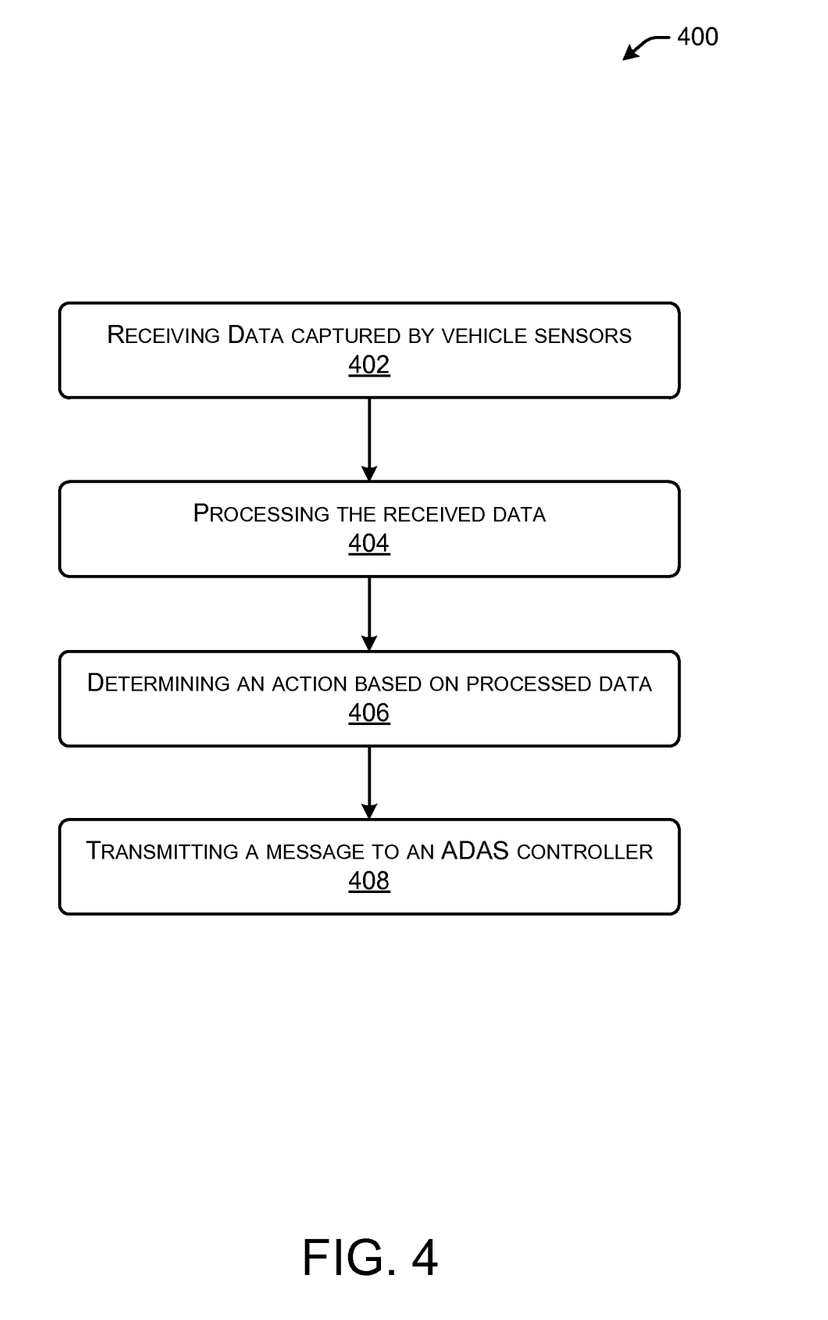
FIG. 4 is a flow diagram of a method for augmenting ADAS features of a vehicle with image processing support in an on-board vehicle platform, in accordance with an embodiment of the disclosure.

FIG. 4 illustrates an example flow diagram for augmenting ADAS features of a vehicle with image processing in on-board vehicle platform, according to one embodiment. In brief overview, the IVI system 110 may receive 402 data captured by vehicle sensors 106. The IVI system 110 may process 404 the received data. The IVI system 110 may analyze 406 the received data. The IVI system 110 may transmit 408 the analyzed data.

Still referring to FIG. 4, in greater detail, in some embodiments, the IVI system 110 may receive 402 data captured by vehicle sensors 106. For example, an ADAS image SoC 270 may communicate with one or more image sensors 106a, 106b, 106c, to capture continuous video or multiple frames of images. Singles frames or a sample of frames may be transferred from the ADAS image SoC 270 to the IVI 215. The images may include additional data, such as a timestamp of when the image was captured or optical data of the image sensor 106. Optical data may include data such as focal length of the image sensors 106 and resolution of the image sensor 106. If the lens parameters of the image sensor 106 are fixed across all images, then the optical parameters may not need to be sent with every image.

The images from the ADAS image SoC 270 may be transmitted to the IVI system 110 at a low frequency. For example, the images may be transmitted from the ADAS image SoC 270 to the IVI system 110 at a rate of about 1 image/second. In some embodiments, images from the image sensors 106 may be transmitted in response to a triggering event identified by the ADAS image SoC 270, such as a change in weather (e.g., if it begins raining). Images may be transmitted over an interface 272 between the ADAS image SoC 270 and the IVI system 110. For example, the interface 272 may be a USB interface or a Media Oriented Systems Transport (MOST) bus.

In some embodiments, the IVI system 110 may process 404 the received data. Processing the received images may be based upon, at least in part, data from an Internet connection, a database, a cloud service, a navigation system 230, or a context engine 232. In some embodiments, basic processing of the images may be performed by one or more components of the vision analysis module 226. Components of the vision analysis module 226 may include image processing 346, scene analysis and feature extraction 348, pattern recognition 350, and/or heuristic analysis 352.

In some embodiments, the vision analysis module 226 may process 404 the images received from the ADAS image SoC 270. As previously discussed, vision analysis module 226 may include an image processing component 346 which may provide image processing functionality, such as zooming, cropping, image projection, linear filtering, pixelation, and/or hidden Markov model (HMM). The images received from the ADAS image SoC 270 may be processed by scene analysis feature extraction 348, pattern recognition module 350, and/or heuristic analysis module 352.

In some embodiments, the ADAS enhancing module 228 may determine an action based upon, at least in part, the processed data. For example, the ADAS enhancing module 228 may receive processed data from the vision analysis module 226. Further, the ADAS enhancing module 228 may receive information from other sources, such as the navigation engine 230, context engine 232, a database, remote server 130, electronic device 140, a cloud service, and/or the Internet.

In some embodiments, data from the navigation engine 230 and/or context engine 232 may be used to enhance the functionality of the ADAS. For example, upcoming road curvature information from the navigation engine 230 may be used for head light control. A context engine 232 may provide vehicle-to-vehicle information from other cars that may provide insight into weather conditions and may be used for wiper control or head light control.

The ADAS enhancing module 228 may determine an action based upon the data received from the vision analysis module 226 and information received from other sources. The following examples are for illustrative purposes, and should not be construed as limitations of this disclosure. The examples illustrate scenarios in which images captured by an ADAS image sensors 106 (e.g., external facing camera of a vehicle 102), may be used by the IVI system 110 to augment the vehicle ADAS offering.

In some embodiments, a WDHD module 362 of the ADAS enhancing module 228 may be used to detect if the vehicle 102 is heading in the wrong direction on a road as well as whether the vehicle is on the correct side of the road. A location of the vehicle 102 may be identified by a GPS device of the vehicle 102. The location of the vehicle may be transmitted to the WRHD module 362. Further, the navigation engine 230 may transmit additional information to the WRHD module 362 of the ADAS enhancing module 228. The WRHD module 362 may determine whether the vehicle 102 is on a one-way road or two-way road and whether the vehicle 102 should be driven on the right-side or the left-side of the road. The images received from the ADAS image SoC 270 may then be analyzed and/or processed by the vision analysis module 346 to detect lanes, road dividers, pavements, and traffic signs which may determine whether the vehicle 102 is currently being driven on the correct side of the road or if the vehicle 102 is heading in the wrong direction on a one-way street. For example, the scene analysis feature extraction 348 module process received images to identify the location of sidewalks and location of traffic signs in an image. The data indicating the identified location of sidewalks and traffic signs by the scene analysis feature extraction module 348 may be transmitted to the WRHD 362 module for further analysis. For example, the WRHD 362 may determine the vehicle 102 is driving on the wrong side of the road and determine 406 an action based upon, at least part, processed images and information from the navigation engine 230.

In another example, a RDWC module 364 may receive processed images from the vision analysis module 226. The RDWC module 364 may apply further processing using techniques and algorithms that may be applied to images from the ADAS image sensors 106 to detect different types of precipitation (e.g., rain, snow, sleet, hail) and its severity. RDWC module 364 may determine 406 an action based upon, at least in part, the processed images and information that may be retrieved locally or retrieved from a source through a network connection. In one example, the action may be to adjust the wipers of the vehicle 102 based upon the detection of precipitation.

In another example, a HLC module 368 may detect the lighting condition surrounding the vehicle 102. The HLC module 368 may communicate with the vision analysis module 226 to request specific processing of the images received from the ADAS image SoC. The HLC module 368 may request processing of images by the vision analysis module 226 captured by a particular image sensor 106 (e.g., a camera with a wider field of vision to better assess lighting conditions). The vision analysis module 226 may identify an oncoming vehicle by detecting the approaching vehicle's headlight while ensuring that road-side lights are not mistaken for vehicles through scene analysis and recognizing bright spots and estimating their distance from the images. Responsive to the scene analysis feature extraction module 348, HLC module 368 may determine an action based upon the processed images. For example, the action determined by the HLC module 368 may be to dim head lights in the case of an oncoming vehicle on a multi-way road without a divider. In some embodiments, the action determined by the HLC module 368 may be to turn ON/OFF headlights based upon the level of ambient light identified by the vision analysis module 226.

The IVI system 110 may transmit 408 a message to an ADAS controller in response to determining or identifying the action. For example, the ADAS enhancing module 228 may generate a message, based upon, at least in part, the determined action and transmit 408 the message to the ADAS controller. The ADAS controller receive and direct the message to the appropriate component of the computing system 205 to fulfill enact the determined action. For example, in the example in which the HLC module 368 identifies an oncoming vehicle and determines to dim the headlights, the ADAS enhancing module 228 may generate a message and transmit the message over the CAN bus to the ADAS controller 380 for the required action. Further, the ADAS controller 380 may transmit the message over the USB interface or MOST bus to the computing system 205 of the vehicle 102. A component of the computing system 205 that controls the headlights of the vehicle 102 may receive the message identifying the action and enact the action.

Certain aspects of the disclosure are described above with reference to block and flow diagrams of systems, methods, apparatus, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method comprising:
   receiving, by one or more processors of a vehicle on-board platform, images from one or more image sensors associated with an advanced driver assistance system (ADAS) of a vehicle;
   processing, by the one or more processors of the vehicle on-board platform, the received images to generate processed images;
   identifying a triggering event based on the processed images;
   determining, by the one or more processors of the vehicle on-board platform, an action based upon, at least in part, the processed images; and
   transmitting, by the one or more processors of the vehicle on-board platform, a message comprising the images from the one or more images sensors to an in-vehicle infotainment (IVI) system in response to the triggering event.

2. The computer-implemented method of claim 1, wherein the images from the one or more image sensors associated with the ADAS are received from an ADAS image system on chip (SoC).

3. The computer-implemented method of claim 1, wherein the images are received via a USB connection, a Bluetooth connection, a fiber optic connection, an Ethernet connection, a Wi-Fi connection, a cellular data connection, or a Media Oriented Systems Transport Bus.

4. The computer-implemented method of claim 1, wherein processing the received images further comprises processing the received images based upon, at least in part, data from at least one of an Internet connection, one or more databases, a navigation system, or a context engine.

5. The computer-implemented method of claim 1, wherein processing the received images further comprises at least one of zooming, cropping, image projection, linear filtering, pixelation, hidden Markov model (HMM), scene analysis, feature extraction, pattern recognition, or heuristic image analysis.

6. The computer-implemented method of claim 1, wherein the received images further comprise additional data, wherein the additional data further includes at least one of a timestamp of when an image of the received images was shot or optical data of at least one of the one or more image sensors.

7. The computer-implemented method of claim 1, further comprising generating a database of image features based upon, at least in part, machine learning techniques to classify images received from the one or more image sensors.

8. A computer program product residing on a non-transitory computer readable medium comprising a plurality of instructions stored thereon, wherein the plurality of instructions are executed by a processor, causing the processor to perform operations comprising:
   receiving data captured by one or more vehicle sensors associated with an advanced driver assistance system (ADAS) of the vehicle;
   analyzing the received data from the one or more vehicle sensors to generate analyzed data;
   identifying a triggering event based on the analyzed data; and
   publishing the analyzed data to an in-vehicle infotainment (IVI) system of the vehicle in response to the triggering event.

9. The computer program product of claim 8, wherein the data from the one or more vehicle sensors is received from an ADAS image system on chip (SoC).

10. The computer program product of claim 8, wherein the data from the one or more vehicle sensors is received over a USB connection, a Bluetooth connection, a fiber optic connection, an Ethernet connection, a Wi-Fi connection, a cellular data connection, or a Media Oriented Systems Transport Bus.

11. The computer program product of claim 8, further comprising processing the received data.

12. The computer program product of claim 11, wherein processing the received data further comprising processing the received data based upon, at least in part, data received from at least one of an Internet connection of the vehicle, one or more databases, a navigation system, or a context engine.

13. The computer program product of claim 8, further comprising generating a database based upon, at least in part, machine learning techniques to classify data received from the one or more vehicle sensors.

14. The computer program product of claim 8, wherein the one or more vehicle sensors further comprise at least one of an ADAS camera, a microphone, or a GPS system.

15. A computing system including a processor and memory configured to perform operations comprising:
   receiving a plurality of images taken by one or more cameras of an advanced driver assistance system (ADAS) of a vehicle;
   analyzing the plurality of images received from the ADAS of the vehicle to generate analyzed images;
   identifying a triggering event based on the analyzed images;
   identifying an action based upon, at least in part, the plurality of analyzed images; and
   transmitting the analyzed images to an in-vehicle infotainment (IVI) system in response to the triggering event.

16. The computer system of claim 15, wherein the plurality of images are received from an ADAS image system on chip (SoC).

17. The computer system of claim 15, further comprising transmitting the plurality of images via a USB connection, a Bluetooth connection, a fiber optic connection, an Ethernet connection, a Wi-Fi connection, a cellular data connection, or Media Oriented Systems Transport Bus.

18. The computer system of claim 15, further comprising augmenting a database by classifying images received from the one or more cameras of the ADAS.

19. The computer system of claim 15, wherein the plurality of images further comprise additional data, wherein the additional data includes at least one of a timestamp of when one of the plurality of images was created, focal length of the camera that took the image of the plurality of images, resolution of the image of the plurality of images, or identification of the type of camera used to take the image of the plurality of images.

20. The computer system of claim 15, further comprising processing the plurality of the received images, wherein processing further comprises at least one of basic image processing, complex signal processing, scene analysis, feature extraction, pattern recognition, or heuristic analysis.

21. The computer system of claim 15, further comprising
   receiving additional data from at least one of an Internet connection, one or more databases, a navigation system, and a context engine; and
   analyzing the plurality of received images based upon, at least in part, the additional data.

* * * * *